(12) United States Patent
Wang et al.

(10) Patent No.: US 7,764,291 B1
(45) Date of Patent: Jul. 27, 2010

(54) IDENTIFICATION OF COMMON VISIBLE REGIONS IN PURPOSING MEDIA FOR TARGETED USE

(75) Inventors: Winston L. Wang, Santa Clara, CA (US); Carol Linburn, San Francisco, CA (US); Simon Hayhurst, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 544 days.

(21) Appl. No.: 11/512,567

(22) Filed: Aug. 30, 2006

(51) Int. Cl.
*G09G 5/00* (2006.01)
(52) U.S. Cl. .................. 345/581; 345/629; 345/591; 345/419
(58) Field of Classification Search .............. 345/419, 345/629, 694, 592, 581
See application file for complete search history.

(56) References Cited

U.S. PATENT DOCUMENTS

| | | | | |
|---|---|---|---|---|
| 5,515,494 A | * | 5/1996 | Lentz | 715/797 |
| 5,982,350 A | * | 11/1999 | Hekmatpour et al. | 345/629 |
| 5,995,672 A | * | 11/1999 | Nagarajan et al. | 382/242 |
| 6,342,882 B1 | * | 1/2002 | Oka | 345/419 |
| 6,480,201 B1 | * | 11/2002 | Fushiki et al. | 345/592 |
| 6,486,888 B1 | * | 11/2002 | Fushiki et al. | 345/592 |
| 6,587,596 B1 | * | 7/2003 | Haeberli | 382/283 |
| 6,621,524 B1 | * | 9/2003 | Iijima et al. | 348/584 |
| 6,694,379 B1 | * | 2/2004 | Hanko et al. | 719/329 |
| 6,807,290 B2 | * | 10/2004 | Liu et al. | 382/118 |
| 6,894,704 B1 | * | 5/2005 | Bourdev et al. | 345/629 |
| 7,057,658 B1 | * | 6/2006 | Shioji et al. | 348/333.12 |
| 7,126,578 B1 | * | 10/2006 | Hamburg | 345/156 |
| 7,394,496 B2 | * | 7/2008 | Shioji et al. | 348/333.11 |
| 7,429,993 B2 | * | 9/2008 | Hui | 345/629 |
| 7,460,119 B2 | * | 12/2008 | Li | 345/421 |
| 2005/0280659 A1 | * | 12/2005 | Paver | 345/629 |

* cited by examiner

*Primary Examiner*—Jin-Cheng Wang
(74) *Attorney, Agent, or Firm*—Fish & Richardson P.C.

(57) ABSTRACT

When purposing content for one or more targeted formats, a user selects a first mask from a plurality of masks in an integrated development environment (IDE). Each of the plurality of masks represent various target formats that the user desires to purpose the content to. Each mask has a transparent region representing a visible area of the target formats and a translucent region surrounding the transparent region. The first mask is placed in a separate layer from the content in the IDE display. The user then selects one or more additional masks that are also placed in separate layers than the content and the first mask. The region where each of the transparent regions of the selected masks intersect identifies a common viewable region of the target formats that have been represented.

47 Claims, 5 Drawing Sheets

IDENTIFICATION OF COMMON VISIBLE REGIONS IN PURPOSING MEDIA FOR TARGETED USE

TECHNICAL FIELD

The present invention relates, in general, to media development environments, and, more specifically, to identifying the common visible region in purposing media for targeted use.

BACKGROUND OF THE INVENTION

In today's information-driven world, it is often desirable to present information in various different media. Content created by a content author, such as a designer, developer, programmer, graphic artist, and the like, may be created specifically for presentation on multiple different devices or in multiple different formats. These different displays and formats may have several different presentation variables, such as display size, aspect ratio, resolution, size, pixel shape and size, and the like. The content author would generally create, reshape, or recreate the content for each different targeted format.

Content may also have been originally created for print or used in print, but later thought to be useful for use or presentation in different ways, such as on a computer screen, mobile phone screen, electronic time varying display, or the like. In creating this print content, it may have been created or printed specifically for a certain size, such as letter size. However, it may also be useful for presentation on postcard-size paper, A4 paper, or the like, or in a different media type entirely, such as a standard computer screen, mobile phone, electronic time varying display, or the like. In order to repurpose this content, content authors typically reshape or reformat the original layout to meet the size or layout restrictions of the new, targeted use, device, or media type.

Creation and modification of such content is typically accomplished using computers and graphics design or page layout applications, such as Adobe Systems Incorporated's ACROBAT®, PAGEMAKER®, ILLUSTRATOR®, FREEHAND®, FRAMEMAKER®, FLASH®, AFTER EFFECTS®, PREMIERE PRO®, DREAMWEAVER®, GOLIVE®, Microsoft Corporation's FRONTPAGE®, and the like. The user generally creates, copies, opens, or scans the content into the development area and graphically generates or manipulates the content and layout to fit the desired target size or specific media presentation aspect for the targeted use. For example, if a company desires to create marketing pamphlets in various paper sizes and also for display on its websites, the author would create the graphics and other content for the pamphlet in an Integrated Development Environment (IDE), such as one of the design applications noted above, and then manipulate the graphics of the pamphlet to make it fit onto the desired target size or device in a pleasing or logical manner. The author would general use multiple editing session resulting in multiple files to accommodate all of the intended target formats. The resulting content would then be printed, stored, or placed into whatever other kind of medium or format that it was intended for.

Another relevant example is the creation or repurposing of content for mobile devices, including mobile phones, personal digital assistants (PDAs), portable media devices, such as Apple Computer Inc.'s IPOD®, Creative Technology Ltd.'s ZENVISION™, iRiver Inc.'s CLIX™, and the like. As these mobile devices become more rich media capable, they become a natural place to consume time varying, interactive, and rich media information. Therefore, content authors are involved in creating new and repurposing existing content specifically for mobile devices. Typically, content authors will make decisions on the layout, presentation, or format of information on a per device basis. With so many devices having multiple different presentation variables, there is a considerable amount of time designing and then fitting the designed content for multiple devices.

A content author may begin the design process by electronically sketching the content in a development environment. In order to make the design process more efficient, the author may use a mask that allows him or her to see the visual dimensions of the various presentation variables for the target media. The author will either create a mask or use a pre-built mask for each mobile device with a separate mask for each device having different presentation variables. The mask is then used as a layer over the content. Part of the mask is typically translucent or opaque, which represents the space outside of the usable display space on the mobile device. A clear portion in the center of the mask shows the visible space available on the device. In this manner, when the user lays the mask over the content, he or she is able to see what will generally be viewable by a person using that particular mobile device. Any part of the content that ends up behind the translucent or opaque section will be content that a user of that particular device would not typically be able to see. The developer may then make the necessary modifications to the content design to fit into the visible display area.

The wide variety of aspect ratios and resolutions available across various media today, and, in particular, across mobile phones and other mobile devices creates an enormous number of variations for any content that is intended to reach multiple media devices. Because a developer purposing content for multiple media devices would generally create several hundred different variations of the content, content creation and repurposing is a very repetitive process that can be very tedious and time consuming. The potential costs to purposing content may, therefore, limit the amount of such authoring that is done and, as a result, reduce the potential benefit that new consumers may have in using content in multiple, different media. Moreover, the time constraints involved in bringing content to the market may result in coarse design decisions being made which may produce an inconsistent quality of information and content display. Such coarsely designed content may be too large or too small for a useful or pleasant user experience.

BRIEF SUMMARY OF THE INVENTION

The present invention is directed to a system and method for purposing information or content for multiple different media types and formats. Purposing information or content includes the creation of original content for a targeted use or format and the modification of existing original content for use in a different targeted use or format (i.e., repurposing). In representative embodiments, a user selects a first mask from a plurality of masks in an integrated development environment (IDE). Each of the plurality of masks represent various target formats that the user desires to purpose the content for. Each mask has a transparent region representing a visible area of the target formats and a translucent region surrounding the transparent region. The various masks selected by the content author are layered on top of one another. As the content is created or modified, the region where each of the transparent regions of the selected masks intersect identifies a common viewable region of the target formats that have been represented. Therefore, the content author may create or adapt content to fit within the common viewable regions. Moreover, various overlapping regions of the translucent regions may also define additional visible regions for a subset of the target formats. This allows the content author to select various design parameters to fit into all or multiple subsets of the target formats.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
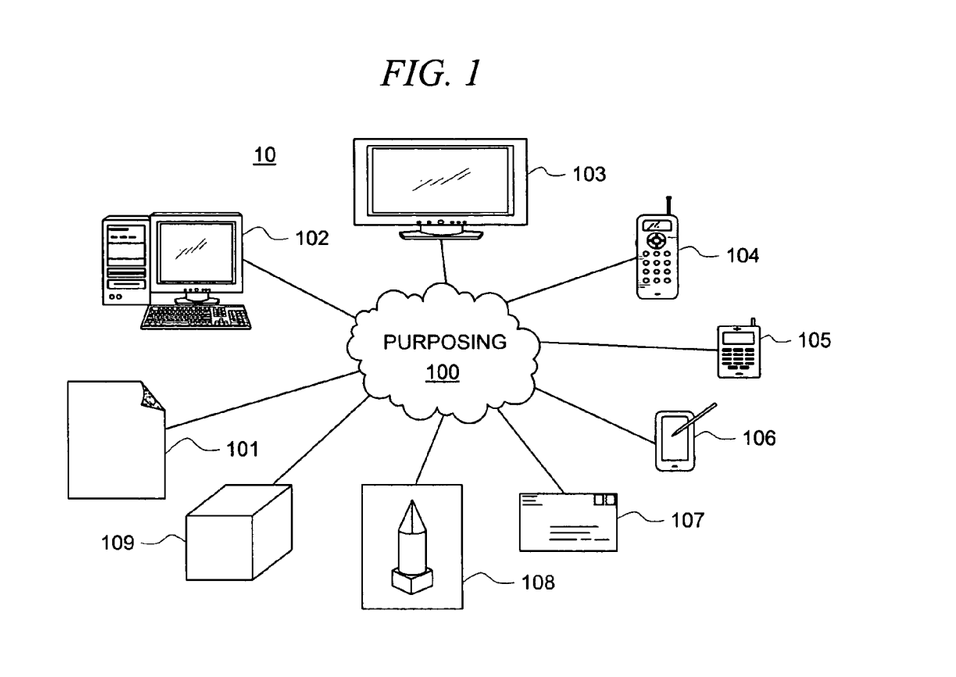
FIG. 1 is a block diagram illustrating a content purposing lifecycle.

FIG. 1 is a block diagram illustrating content purposing lifecycle 10. Content takes on many different forms and is represented in many different media or target formats. It may comprise print media, such as page 101 or postcard 107; computer media, such as computer 102, which may be simply electronic images or a complex Rich Internet Application (RIA); television content, such as the content displayed on television 103; mobile device content, which may be displayed on mobile phones 104-105 and PDA 106; three-dimensional content, such as hologram image 108 and block sculpture 109. Content, thus, is any type of information that is eventually presented in a physical or sensory manner, whether through electronics and computers or physical material.

In example operation, a content author desires to create content for mobile phones 104 and 105 and also for PDA 106. Instead of working with three different content files that are specifically targeted for each of the devices, the content author selects to display masks representing mobile phones 104 and 105 and PDA 106 onto the design area of an IDE implementing content purposing process 100. For example, one such mask may provide a shaded region surrounding a clear region that represents the viewable area on the display of mobile phone 104, while the other masks provide similar transparent and translucent regions representing the viewable areas on mobile phone 105 and PDA 106. With each of the mask's transparent region intersecting into a common transparent region, the author may create the content to fit within the visible display areas of each of mobile phones 104 and 105 and PDA 106 by drafting the content within that common transparent region. Optionally, the content author may choose to include the majority of the content in the common transparent region, but allow some of the content to enter the overlapped translucent regions of selected ones of the target devices. For example, the author may design the content to fit squarely within the visible region of PDA 106, but allow some of the content to extend into the translucent regions of mobile phones 104 and 105. This extending of the content beyond the visible screen region of mobile phones 104 and 105 may require the user of those mobile phones to use a scrolling function to view the entire content.

In other circumstances, there may be content that is originally presented in a first media that a content author desires to purpose for use in new media. For example, if a content author desires to purpose the graphics content of a computer application that runs on computer 102 to adequately display on mobile phones 104-105 and PDA 106, he or she may use content purposing process 100 to crop, modify, and the like, the graphics content and user interface (UI) graphics to fit onto the screens of mobile phones 104-105 and PDA 106. In content purposing process 100, which is configured according to one embodiment of the present invention, the author would display the application graphics onto a design screen and select multiple purposing masks that were generated to show what portion of the application graphics will fit in the viewing area of the particular mobile device. The user would select to layer this purposing mask on top of the application graphics. Any of the graphics that remain visible through the transparent region would, therefore, be visible when presented on mobile phone 104. The user then either modifies, crops, or performs any other such editing on the images to accommodate the display size of mobile phone 104.

Additionally, the user could select to layer purposing masks that show the visible screen area for mobile phone 105 and PDA 106 on top of the mask representing the visible area of mobile phone 104. In this process, the user can see the visible display area that is common to all of mobile phones 104-105 and PDA 106. If the user desires to make a single application that will be viewable on each of mobile phones 104-105 and PDA 106, he or she could then crop or modify the application and UI graphics to fit in the common visible region.

Content purposing may also be conducted in three-dimensions (3D) with physical items, such as block sculpture 109. Purposing 3D content may comprise representing the content in another target 3D media, such as another physical item, a holographic image, an orthographic projection, or some other kind of 3D perspective projection. In operation, a content author may scan or draw an electronic, 3D representation of block sculpture 109 into an IDE that implements content purposing process 100. The content author would then select the type and size of target media desired and a purposing mask or masks that represent those selected target media would be layered on top of the scanned or drawn content. In the described example, content author desires to create a hologram and a postcard that includes the image of block sculpture 109. Masks for both target media and presentation variables would be layered on top of the scanned or drawn image of block sculpture 109, with the part of the image visible through the intersection of the transparent portions of the masks being the common region visible in both target media. The user would then crop, modify, or perform some other type of editing of the image to fit the resulting content into the target media, i.e., hologram image 108 and postcard 107.

It should be noted that content purposing process 100 may be used to purpose content for any target formats, either through creating new content or repurposing existing content. It should further be noted that when operating content purposing process 100 with 3D content, some 3D masks may be created from certain two-dimensional (2D) masks by extending the 2D mask into a 3D representation through an orthographic or other perspective projection.

When purposing content for some target forms of media, such as mobile devices, the target devices are not always uniform in display-size or resolution. Because there is no uniformity, multiple variations of purposed content are typically created in order to conform to each of the presentation variables of the various target devices, such as display size, aspect ratio, density, pixel shape, resolution, and the like. Alternatively, a content author could select to purpose content to a certain single set of presentation variables, but do so in such a fashion that would accommodate the most devices possible.

Figure 2A:
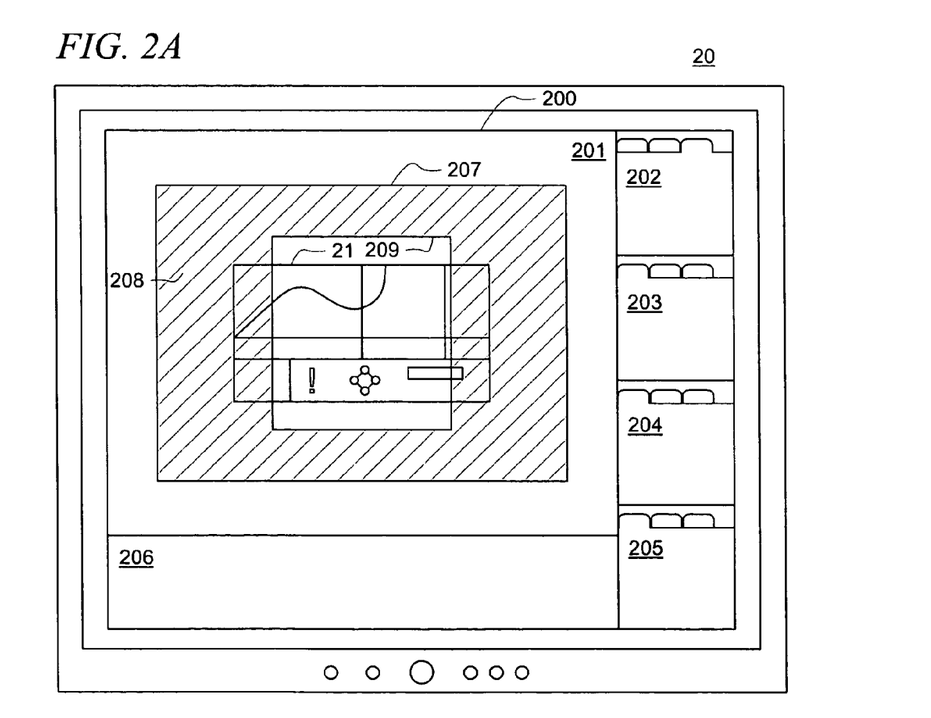
FIG. 2A is a screenshot illustrating a content purposing system configured according to one embodiment of the present invention.

FIG. 2A is a screenshot illustrating content purposing system 20 configured according to one embodiment of the present invention. Content purposing system 20 is implemented through IDE 200. IDE 200 uses typical interface features, such as tool panels 202-205, property inspector 206, and design canvas 201. For purposes of this example, a content author desires to purpose content 21 from one media for use on mobile phones 104-106 (FIG. 1). The author begins by placing content 21 onto design canvas 201. Using a pull-down menu or one of tool panels 202-205, the author selects to purpose content 21 to a mobile device and selects the actual mobile phone device model, mobile phone 104 (FIG. 1). Once selected, purposing mask 207, which represents mobile phone 104, is layered on top of content 21. Purposing mask 207 provides translucent region 208 and transparent region 209 that represents the display dimensions and presentation variables of mobile phone 104 (FIG. 1).

Figure 2B:
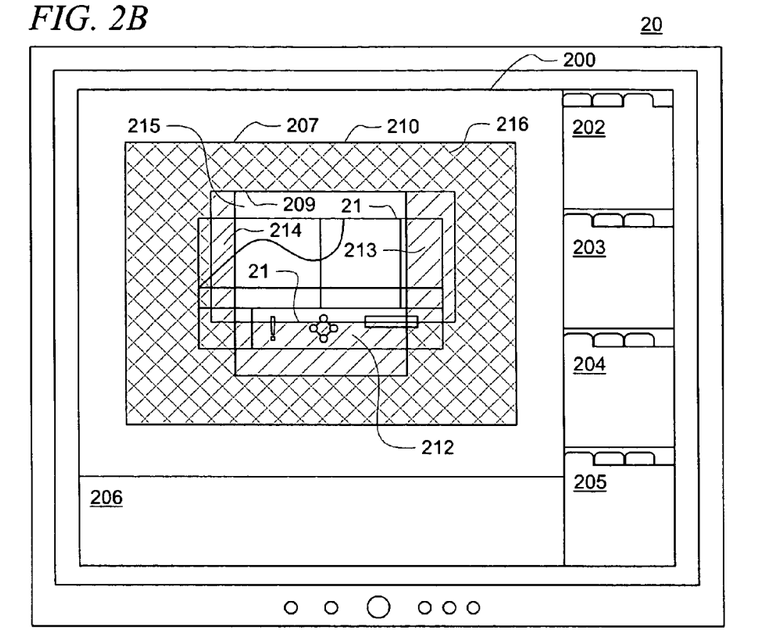
FIG. 2B is a screenshot illustrating the content purposing system configured according to one embodiment of the present invention having added a purposing mask.

FIG. 2B is a screenshot illustrating content purposing system 20 configured according to one embodiment of the present invention having added purposing mask 210. After selecting purposing mask 207, the content author accesses the tools menu again to select the purposing mask that represents mobile phone 105 (FIG. 1), i.e., purposing mask 210. Purposing mask 210 is then layered on top of purposing mask 207 within IDE 200. Because mobile phone 105 (FIG. 1) has a different display size and difference presentation variables, transparent region 209 for purposing mask 207 is partially obscured by translucent region 216, which surrounds transparent region 211 representing the visible region of mobile phone 105 (FIG. 1). The overlapping transparent regions produce common region 215. The part of underlying content 21 that shows through common region 215 is the part of content 21 that would be visible on both mobile phones 104 and 105 (FIG. 1). The overlapping translucent regions also provide the author with visible cues as to what portions of content 21 are commonly not visible, and what portions may be visible on one but not the other. Single overlap region 212 shows the content author that content 21, in this region, would not be visible on either mobile phones 104 and 105 (FIG. 1). Single overlap regions 213 and 214 show the content author that content 21, in this region, would not be visible on mobile phone 105 (FIG. 1), but would be visible on mobile phone 104 (FIG. 1). Thus, not only does common region 215 give the content author useful information regarding the visibility of content 21 on the target devices, but some of the translucent and overlapped areas also give the content author information that could be used to decide whether it is better to create a single piece of content that could be seen on each of the desired mobile phones, such as mobile phones 104 and 105 (FIG. 1), or to create multiple sizes for each one individually.

Figure 2C:
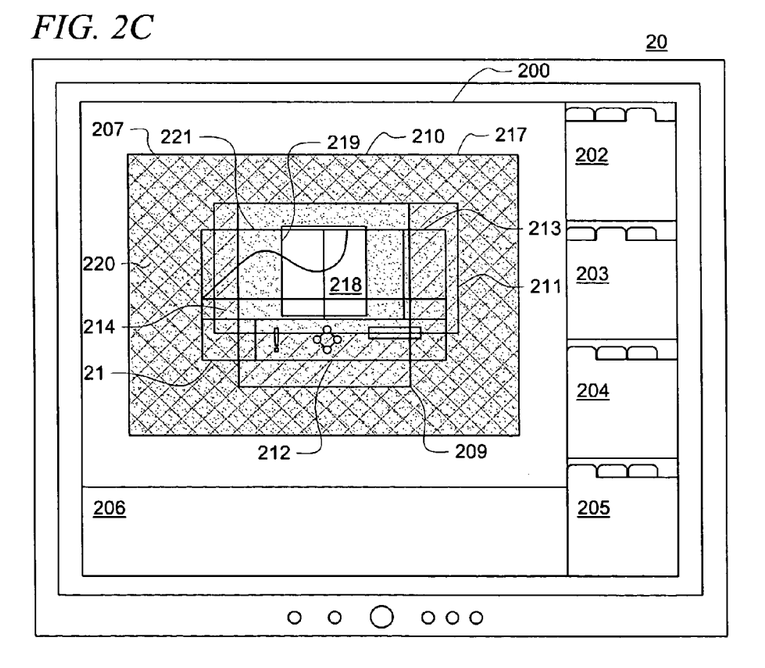
FIG. 2C is a screenshot illustrating the content purposing system configured according to one embodiment of the present invention having added another purposing mask.

FIG. 2C is a screenshot illustrating content purposing system 20 configured according to one embodiment of the present invention having added purposing mask 217. After selecting purposing masks 207 and 210, the content author accesses the tools menu again to select the purposing mask that represents PDA 106 (FIG. 1), i.e., purposing mask 217. Purposing mask 217 is then laid on top of purposing masks 207 and 210 within IDE 200. Transparent region 219 represents the viewable display of PDA 106 (FIG. 1) and intersects with and partially obscures transparent regions 209 and 211 to create common region 218. Underlying content 21 visible through common region 218 represents the part of content 21 that would be seen on all mobile phones 104-105 and PDA 106 (FIG. 1).

Once the content author selects and overlays all of the desired purposing masks, he or she may either crop content 21 to fit within any one or all of transparent regions 209, 211, and 219, scale content 21 to fit more of its visual area with any one or all of transparent regions 209, 211, and 219, or modify content 21 to rearrange its component objects or parts to fit more of the interesting areas within any one or all of transparent regions 209, 211, and 219. Various different fitting edits may be used to modify the purposed content, such as cropping, scaling, shrinking (maintaining the same aspect ratio), non-linear scaling, clipping, extending, extrapolating, and the like.

It should be noted that in the embodiment of the present invention illustrated in FIGS. 2A, 2B, and 2C, translucent regions 209, 211, and 219 have varying degrees of translucency. In terms of graphic representation, the alpha channel level of the translucent regions is neither completely a zero nor 100%. Thus, as the translucent regions are layered on top of one another, the combined translucency becomes less or the alpha channel level moves toward 100%. This variation in combined translucency may assist the user in determining what part or parts of the content is visible in the transparent regions of the various purposing masks.

It should further be noted that in various additional and/or alternative embodiments of the present invention, the overlapped regions, such as single overlap regions 212-214, may be presented with specialized visible cues that prompt or inform the content author with regard to the meaning of the overlap. For example, translucent regions 209, 211, and 219 may use different translucent color hues, such that when an overlap occurs a completely different color is created by the combination of the overlapping colors of the overlapping translucent regions. Other visual indicators may also be used, such as adding texture or dimensional cues that draws visual attention to the overlapped regions.

Figure 3:
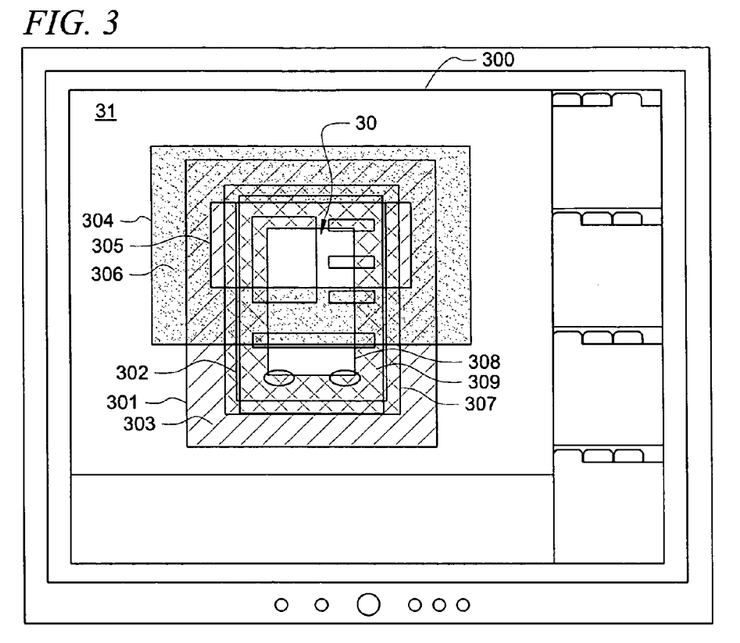
FIG. 3 is a block diagram illustrating an IDE configured according to one embodiment of the present invention.

FIG. 3 is a block diagram illustrating IDE 300 configured according to one embodiment of the present invention. When creating content destined for presentation in multiple target media types or formats, the various target formats may have different presentation variables from other electronic formats. Depending on the display resolution of the specific target device, the appearance of the content will vary. In the embodiment of the present invention illustrated in FIG. 3, IDE 300 provides purposing masks that are normalized according to the resolution of the targeted format or device. Therefore, the size of the mask will vary depending on the resolution of the target media.

For example, IDE 300 displays content 30 within edit region 31. The user has selected three different masks, masks 301, 304, and 307, to overlay onto content 30. Each of masks 301, 304, and 307 is a different size, representing a different resolution of the associated target format or device. Transparent region 302 of purposing mask 301 is sized for a display with a resolution of 1280×1024 pixels. Transparent region 305 of mask 304 is sized for a display with a resolution of 1366×768 pixels. Transparent region 308 of mask 307 is sized for a display with a resolution of only 640×480. When comparing the actual physical size of the different electronic displays, their physical dimensions may not differ by that much. However, because their pixel size and/or number of pixels in the resolution may differ substantially, the appearance of the displayed content will change from display to display.

In IDE 300, the mask is normalized according to pixel size, which causes masks 301, 304, and 307 to be of different overall sizes. In comparison to the embodiment depicted in FIGS. 2A-C, purposing masks 207, 210, and 217 are normalized according to the size of the mask itself or design canvas 201 of IDE 200 leaving variations in the transparent regions to reflect the differences in the visible regions. It should be noted that in various embodiments of the present invention, an IDE may include a feature that allows the user to toggle between normalizing the mask size either according to pixel-size/resolution or to the design canvas size.

Figure 4:
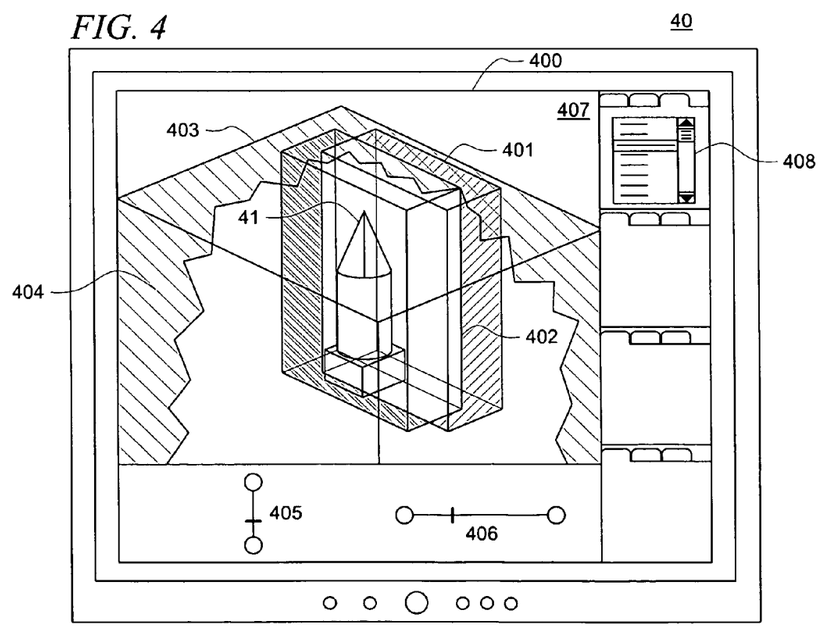
FIG. 4 is a block diagram illustrating a content purposing system with an IDE configured according to one embodiment of the present invention.

FIG. 4 is a block diagram illustrating content purposing system 40 with IDE 400 configured according to one embodiment of the present invention. The user of IDE 400, i.e., the content author, desires to purpose a solid support piece into another material and a different 3D presentation media, such as holographic image. An electronic visual representation of the solid support piece, 3D content 41, is displayed in edit region 407. 3D content 41 represents a fastener peg of some sort. The original solid piece is cast from a particular metal. The content author would like to repurpose the peg for use in a non-metal material, such as concrete, plaster, ceramic, or the like. However, in order to create a fastener that will be functional without having to be reinforced by a separate process or additional material, the repurposed peg should be limited in size. Based on this desired target material and purpose, the content author accesses mask tools palette 408 to select 3D mask 402. With the selection, 3D mask 402 is layered on top of 3D content 41.

In its 3D representation, a central transparent region defines the safe and permissible size of non-reinforced target material. 3D mask 402 also includes a translucent region, which is partially and dynamically removed/restored from the content author's line-of-sight. Thus, as the author rotates the view of 3D content 41 in edit region 407 using control sliders 405 and 406, the portion of the translucent region that enters the user's line-of-sight will be removed, and the portion that exits the user's line-of-sight will be returned to view. The content author next accesses mask tools palette 408 to select 3D mask 401, which is sized for a holographic security image. The selected 3D mask 401 is layered over 3D content 41 and mask 402. Once both masks are in place, the user may rotate views of 3D content 41 with control sliders 405 and 406 and determine how to resize it to fit into the size requirements of 3D masks 401 and 402.

Figure 5:
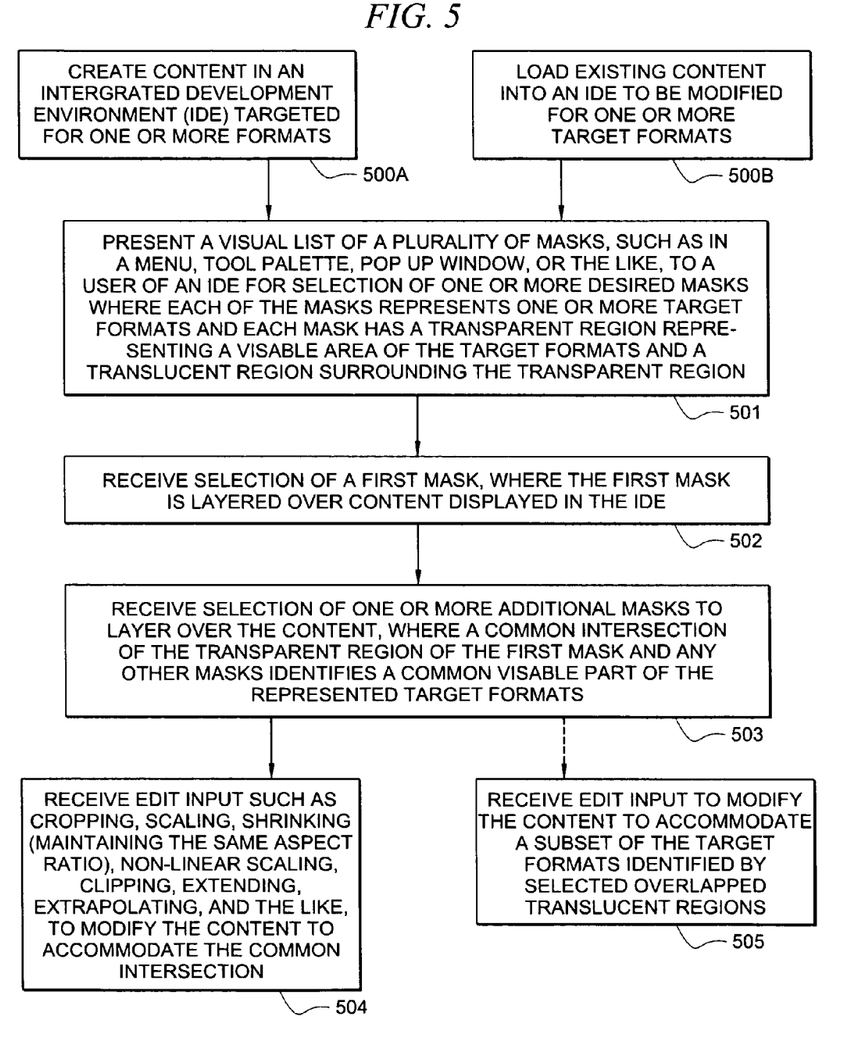
FIG. 5 is a flowchart illustrating example steps executed to implement one embodiment of the present invention.

FIG. 5 is a flowchart illustrating example steps executed to implement one embodiment of the present invention. Because the content purposing system of the present invention may be used in creating targeted content or repurposing existing content into a new targeted format, there are alternative beginning steps. In step 500A, a content author begins creation of content targeted for one or more formats in an IDE. In step 500B, a content author loads existing content that is designated to be modified for one or more formats. In step 501, a visual list of a plurality of masks, such as in a menu, tool palette, pop-up window, or the like, is presented to a user of an IDE for selection of one or more desired masks where each of the masks represents one or more target formats and each mask has a transparent region representing a visible area of the target formats and a translucent region surrounding the transparent region. Selection of a first mask is received, in step 502, where the first mask is placed in a separate layer than the content displayed in the IDE. Selection of one or more additional masks is received, in step 503, to place in yet another layer separate from the content and the first mask, where a common intersection of the transparent region of the first mask and any other masks identifies a common visible part of the represented target formats. In step 504, edit input is received such as cropping, scaling, shrinking (maintaining the same aspect ratio), non-linear scaling, clipping, extending, extrapolating, and the like, to modify the content to accommodate the common intersection.

It should be noted that in alternative step 505, edit input is received to accommodate a subset of target formats that are identified by selected overlapped translucent regions. By selecting the subset of target formats, the content author modifies the content to fit within the visible regions of those target formats.

The program or code segments making up the various embodiments of the present invention may be stored in a computer readable medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The code segments may be downloaded via computer networks such as the Internet, Intranet, and the like.

Figure 6:
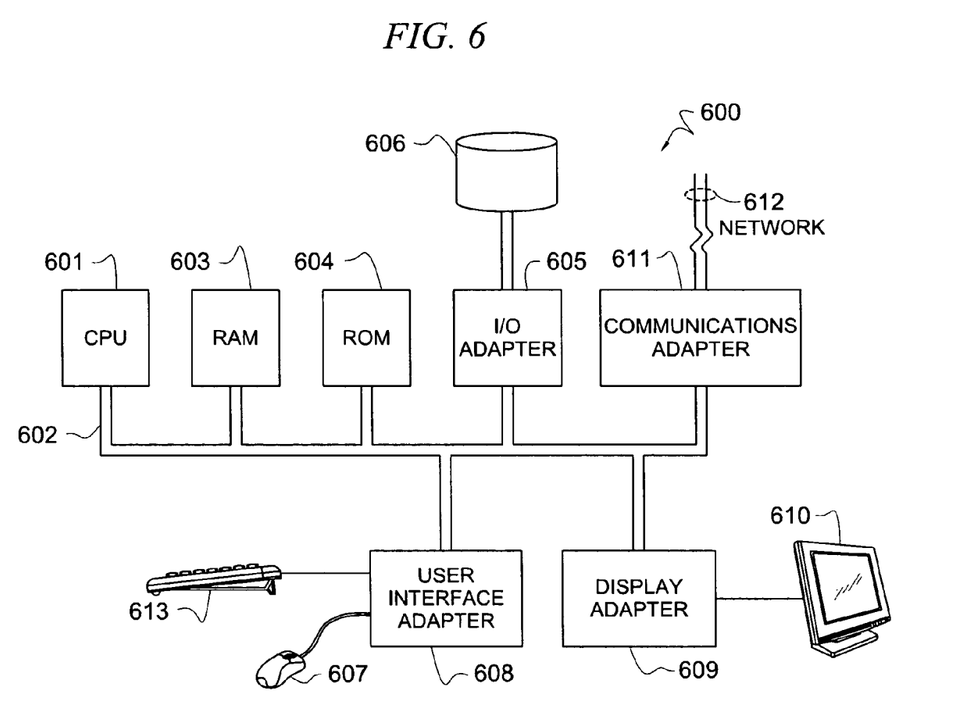
FIG. 6 illustrates a computer system adapted to use embodiments of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, and the like, to the computer system 600. The display card 609 is driven by CPU 601 to control the display on display device 610.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method of identifying a common visible region in purposing media, the method comprising:

receiving selection, in an integrated development environment (IDE) encoded on a computer readable medium, of a first mask from a plurality of masks, each of said plurality of masks representing one or more mobile communication device formats, each of said plurality of masks having at least one of the one or more mobile communication device formats being different than at least one of the one or more mobile communication device formats of another of said plurality of masks, and each of said plurality of masks having:

an un-obscuring region for content, the un-obscuring region representing a visible display area of said represented one or more mobile communication device formats; and an obscuring region for the content, the obscuring region representing a non-visible area of said represented one or more mobile communication device formats;

wherein the visible display area represented by the un-obscuring region for the first mask is different than at least one visible display area represented by at least one un-obscuring region for one or more additional masks from said plurality of masks;

wherein said first mask is layered separately from the content when displayed in said IDE;

receiving, in the IDE encoded on said computer readable medium, selection of said one or more additional masks from said plurality to lay over said content;

displaying a common intersection of said un-obscuring region of said first mask and said one or more additional masks to identify a common visible display part of said represented one or more mobile communication device formats of said first mask and said one or more additional masks; and distinguishing overlapping regions of said first mask and said one or more additional masks, wherein the distinguished overlapping regions correspond to respective portions of said content that are visible on the common visible display region of respective proper subsets of the represented mobile communication device formats, wherein receiving selection of the first mask, receiving selection of the one or more additional masks, displaying the common intersection, and distinguishing the overlapping regions are performed by a data processing apparatus.

2. The method of claim 1 further comprising:
accepting input from a content author to generate said content for use in said one or more mobile communication device formats.

3. The method of claim 1 further comprising:
loading said content into said IDE, wherein said content is pre-existing.

4. The method of claim 1 further comprising:
normalizing said plurality of masks according to one of:
a resolution of said one or more mobile communication device formats; and
an edit region of said IDE.

5. The method of claim 4 further comprising:
presenting an option in said IDE to alternatively select said normalizing according to one of said resolution and said edit region.

6. The method of claim 1 wherein one or more of said plurality of masks comprise a three-dimensional mask for layering over three-dimensionally rendered content.

7. The method of claim 6 further comprising:
removing display of parts of said obscuring region of said three-dimensional mask for said parts located in a line-of-sight between a content author and said un-obscuring region;
and
restoring display of said removed parts when said parts exist said line-of-sight.

8. The method of claim 1 further comprising:
presenting a visual list of said plurality of masks in one or more of:
a menu;
a tool palette; and
a pop-up window;
wherein a content author makes selection of said first mask and said one or more additional masks from said visual list.

9. The method of claim 1 further comprising:
receiving input to modify said content to accommodate said common intersection according to one or more of:
cropping;
linear scaling;
non linear scaling;
shrinking;
clipping;
extending;
extrapolating; and
editing composition of one or more objects of said content.

10. The method of claim 1 wherein each obscuring region of said plurality of masks includes a separate color hue; and
wherein overlapping regions of said obscuring region of said first mask and said one or more additional masks create a different color.

11. The method of claim 1 wherein overlapping regions of said obscuring region of said first mask and said one or more additional masks decreases an obscuration of said overlapped obscuring region.

12. The method of claim 1 further comprising:
rendering one or more visual indicator within overlapping regions of said obscuring region of said first mask and said one or more additional masks, wherein each of said one or more visual indicators represents a subset of said represented one or more mobile communication device formats.

13. The method of claim 12 wherein said one or more visual indicators comprises one or more of:
a color;
a texture;
a graphic;
text; and
three-dimensional shading.

14. A computer implemented method of identifying a common viewing region in purposing media, the method comprising:
presenting a plurality of masks, wherein each of said plurality of masks represents a mobile communication device format and comprises a partially transparent region for content surrounding a 100% transparent region for the content, said 100% transparent region representing a display area of said mobile communication device format, wherein the display area of the mobile communication device format of a first of said plurality of masks is different than the display area of one or more mobile communication device formats of one or more additional masks from said plurality of masks;
responsive to receiving user specified content for presentation in a display area of each mobile communication device format, displaying the specified content in an integrated development environment (IDE);
responsive to receiving user selection of the first mask and the one or more additional masks:
overlaying the first mask and the one or more additional masks over said specified content by disposing the first mask and the one or more additional masks in respective layers that are separate from the specified content;
displaying in the IDE the first mask and the one or more additional masks overlaid over the specified content;
identifying an intersection of said 100% transparent region of said first mask and said one or more additional masks, wherein the identified intersection corresponds to a portion of the specified content that is visible on a common display region of each of said represented mobile communication device format of said first mask and said one or more additional masks; and
distinguishing overlapping regions of the overlaid first mask and said one or more additional masks, wherein the distinguished overlapping regions correspond to respective portions of the specified content that are visible on the common display region of respective proper subsets of the represented mobile communication device formats,
wherein the presenting, the overlaying, the identifying, the distinguishing, the displaying of the first mask and the one or more additional masks, and the displaying of the specified content are performed by a data processing apparatus.

15. The method of claim 14 further comprising:
receiving input from a user to create said content.

16. The method of claim 14 further comprising:
receiving input from a user to load said content into said IDE, wherein said content is pre-existing.

17. The method of claim 14 further comprising:
sizing said plurality of masks according to one of:
a resolution of a repurpose format; and
a design region of said IDE.

18. The method of claim 17 further comprising:
prompting a user in said IDE to alternatively select said sizing according to one of said resolution and said design region.

19. The method of claim 14 wherein one or more of said plurality of masks comprise a three-dimensional mask for layering over three-dimensionally rendered content.

20. The method of claim 19 further comprising:
removing display of parts of said partially transparent region of said three-dimensional mask for said parts located in a line-of-sight between a user and said 100% transparent region; and
restoring display of said removed parts when said parts exist said line-of sight.

21. The method of claim 14 further comprising:
presenting a list of said plurality of masks in one or more of:
a menu;
a tool palette; and
a pop-up window;
wherein selection of said first mask and said one or more additional masks is made from said list.

22. The method of claim 14 further comprising:
receiving input to modify said content to accommodate said intersection according to one or more of:
cropping;
linear scaling;
non-linear scaling;
shrinking;
clipping;
extending;
extrapolating; and
edition composition of one or more objects of said content.

23. The method of claim 14 further comprising:
displaying a visual indicator within each overlapping region of said partially transparent region of said first mask and said one or more additional masks, wherein said visual indicator represents a subset of each of said represented mobile communication device formats making up said overlapping region.

24. The method of claim 23 wherein said visual indicator comprises one or more of:
a color;
a texture;
a graphic;
text; and
three-dimensional shading.

25. A computer program product having a computer readable medium with computer program logic recorded thereon, said computer program logic for identifying a common visible region in purposing media, said computer program product comprising code for causing a data processing apparatus to perform operations comprising:

receiving a selection of a first mask from a plurality of masks, each of said plurality representing one or more mobile communication device formats;

rendering said first mask in a layer separate from content on a display of an integrated development environment (IDE), wherein said rendering includes presenting said first mask with an obscuring region for the content surrounding an un-obscuring region for the content, said un-obscuring region representing a visible display area of said one or more mobile communication device formats, wherein the visible display area of the first of said plurality is different than the visible area of one or more mobile communication device formats of one or more additional masks from said plurality;

receiving selection of the one or more additional masks from said plurality to layer over said content;

displaying a common intersection of said un-obscuring region of said first mask and said one or more additional masks to identify a common visible display part of said represented one or more formats of said first mask and said one or more additional masks; and distinguishing overlapping regions of said first mask and said one or more additional masks, wherein the distinguished overlapping regions correspond to respective portions of said content that are visible on the common visible display part of respective proper subsets of the represented mobile communication device formats.

26. The computer program product of claim 25 further comprising code for causing the data processing apparatus to perform operations comprising:
   accepting input to generate said content for use in said one or more mobile communication device formats.

27. The computer program product of claim 25 further comprising code for causing the data processing apparatus to perform operations comprising:
   loading said content into said IDE, wherein said content is pre-existing.

28. The computer program product of claim 25 further comprising code for causing the data processing apparatus to perform operations comprising:
   sizing said plurality of masks according to one of:
   a resolution of said one or more mobile communication device formats; and
   a design space of said IDE.

29. The computer program product of claim 28 further comprising code for causing the data processing apparatus to perform operations comprising:
   presenting an option for a user to select said sizing according to one of said resolution and said design space.

30. The computer program product of claim 25 wherein one or more of said plurality of masks comprise a three-dimensional mask for use with three-dimensionally rendered content.

31. The computer program product of claim 30 further comprising code for causing the data processing apparatus to perform operations comprising:
   removing display of parts of said obscuring region of said three-dimensional mask for said parts located in a line-of-sight between a user and said un-obscuring region; and
   code for restoring display of said removed parts when said parts exist said line-of-sight.

32. The computer program product of claim 25 further comprising code for causing the data processing apparatus to perform operations comprising:
   presenting a visual list of said plurality of masks in one or more of:
   a menu;
   a tool palette; and
   a pop-up window;
   wherein selection of said first mask and said one or more additional masks is made from said visual list.

33. The computer program product of claim 25 further comprising code for causing the data processing apparatus to perform operations comprising:
   receiving input to modify said content to accommodate said common intersection according to one or more of:
   cropping;
   linear scaling;
   non-linear scaling;
   shrinking;
   clipping;
   extending;
   extrapolating; and
   editing composition of one or more objects of said content.

34. The computer program product of claim 25 wherein each obscuring region of said plurality of masks includes a separate color hue; and
   wherein one or more overlapping regions of said obscuring region of said first mask and said one or more additional masks create a different color.

35. The computer program product of claim 25 wherein overlapping regions of said obscuring region of said first mask and said one or more additional masks decreases an obscuration of said overlapped obscuring region.

36. The computer program product of claim 25 further comprising code for causing the data processing apparatus to perform operations comprising:
   rendering one or more visual indicator within overlapping regions of said obscuring region of said first mask and said one or more additional masks, wherein each of said one or more visual indicators represents a subset of said represented one or more mobile communication device formats.

37. The computer program product of claim 36 wherein said one or more visual indicators comprises one or more of:
   a color;
   a texture;
   a graphic;
   text; and
   three dimensional shading.

38. A computer implemented method of identifying a common viewing region in purposing media, the method comprising:
   presenting a plurality of masks wherein each of said plurality of masks represents a mobile communication device and comprises a partially transparent region for content surrounding a 100% transparent region for the content, said 100% transparent region representing a display viewing area of said mobile communication device, wherein the display area of the mobile communication device of a first of said plurality of masks is different than the display area of one or more mobile communication devices one or more additional masks from said plurality of masks;
   responsive to receiving user specified content for presentation in a display area of each mobile communication device, displaying the specified content in an integrated development environment (IDE);
   responsive to receiving user selection of the first mask and the one or more additional masks:
   overlaying the first mask and the one or more additional masks in one or more other layers different than said specified content;

displaying in the IDE the first mask and the one or more additional masks overlaid over the specified content;

identifying an intersection of said 100% transparent region of said first mask and said one or more additional masks, wherein the identified intersection corresponds to a portion of the specified content that is visible on a common display region of each of said first mask and said one or more additional masks;

distinguishing overlapping regions of the overlaid first mask and one or more additional masks, wherein the distinguished overlapping regions correspond to respective portions of the specified content that are visible on the common display region of respective proper subsets of the represented mobile communication devices; and displaying a visual indicator within each overlapping region of said partially transparent region of said first mask and said one or more additional masks, wherein said visual indicator represents a subset of each of said represented mobile communication devices making up said overlapping region, wherein the presenting, the rendering the first mask and the one or more additional masks, the identifying the intersection, the distinguishing the overlapping regions, and the displaying the intersection and the visual indicator are performed by a data processing apparatus.

39. The method of claim 38 further comprising:
receiving input to create said content.

40. The method of claim 38 further comprising:
receiving input to load said content into said IDE, wherein said content is pre-existing.

41. The method of claim 38 further comprising:
sizing said plurality of masks according to one of:
a resolution of a repurpose use; and
a design region of said IDE.

42. The method of claim 41 further comprising:
prompting a user in said IDE to alternatively select said sizing according to one of said resolution and said design region.

43. The method of claim 38 wherein one or more of said plurality of masks comprise a three-dimensional mask for use with three-dimensionally rendered content.

44. The method of claim 43 further comprising:
removing display of parts of said partially transparent region of said three-dimensional mask for said parts located in a line-of-sight between a user and said unobscuring region; and
restoring display of said removed parts when said parts exit said line-of-sight.

45. The method of claim 38 further comprising:
presenting a list of said plurality of masks in one or more of:
a menu;
a tool palette; and
a pop-up window;
wherein selection of said first mask and said one or more additional masks is made from said list.

46. The method of claim 38 further comprising:
receiving author input to modify said content to accommodate said intersection according to one or more of:
cropping;
linear scaling;
non-linear scaling;
shrinking;
clipping;
extending;
extrapolating; and
editing composition of one or more objects of said content.

47. The method of claim 38 wherein said visual indicator comprises one or more of:
a color;
a texture;
a graphic;
text; and
three-dimensional shading.

* * * * *